United States Patent [19]

Grimm et al.

[11] 4,079,450
[45] Mar. 14, 1978

[54] INPUT-OUTPUT-COLOR-SCREEN SYSTEM

[75] Inventors: Rudi Grimm, Stutensee; Max Syrbe, Karlsruhe; Herbert Truck, Stutensee, all of Germany

[73] Assignee: Fraunhofer-Gesellschaft Zur Forderung der angewandten Forschung e.V., Munich, Germany

[21] Appl. No.: 624,637

[22] Filed: Oct. 21, 1975

[30] Foreign Application Priority Data

Mar. 12, 1975 Germany .......................... 2510632

[51] Int. Cl.² .............................................. G06F 3/14
[52] U.S. Cl. .................................................. 364/200
[58] Field of Search ........ 340/172.5, 324 AD, 324 A; 445/1; 364/200 MS, 900 MS, 324 A, 324 AD

[56] References Cited

U.S. PATENT DOCUMENTS

| | | | |
|---|---|---|---|
| 3,418,459 | 12/1968 | Purdey et al. | 340/172.5 X |
| 3,534,396 | 10/1970 | Hart et al. | 340/172.5 X |
| 3,653,001 | 3/1972 | Ninke et al. | 340/172.5 |
| 3,697,678 | 10/1972 | Balleson | 340/324 AD |
| 3,786,479 | 1/1974 | Brown et al. | 340/324 AD |
| 3,800,288 | 3/1974 | Russell et al. | 340/172.5 |
| 3,811,113 | 5/1974 | Saito et al. | 340/172.5 |
| 3,895,357 | 7/1975 | Schwartz et al. | 340/172.5 |

*Primary Examiner*—Harvey E. Springborn
*Attorney, Agent, or Firm*—John C. Smith, Jr.

[57] ABSTRACT

An input-output-color-screen system is provided having a color display screen device and a microcomputer having an associated working memory which is used as a screen refreshing memory, and a minidisc storage device for storing information signals. A virtual key board including symbols is provided on a section of the screen, and a light pen with associated control means is used to manually select desired symbols for display.

3 Claims, 8 Drawing Figures

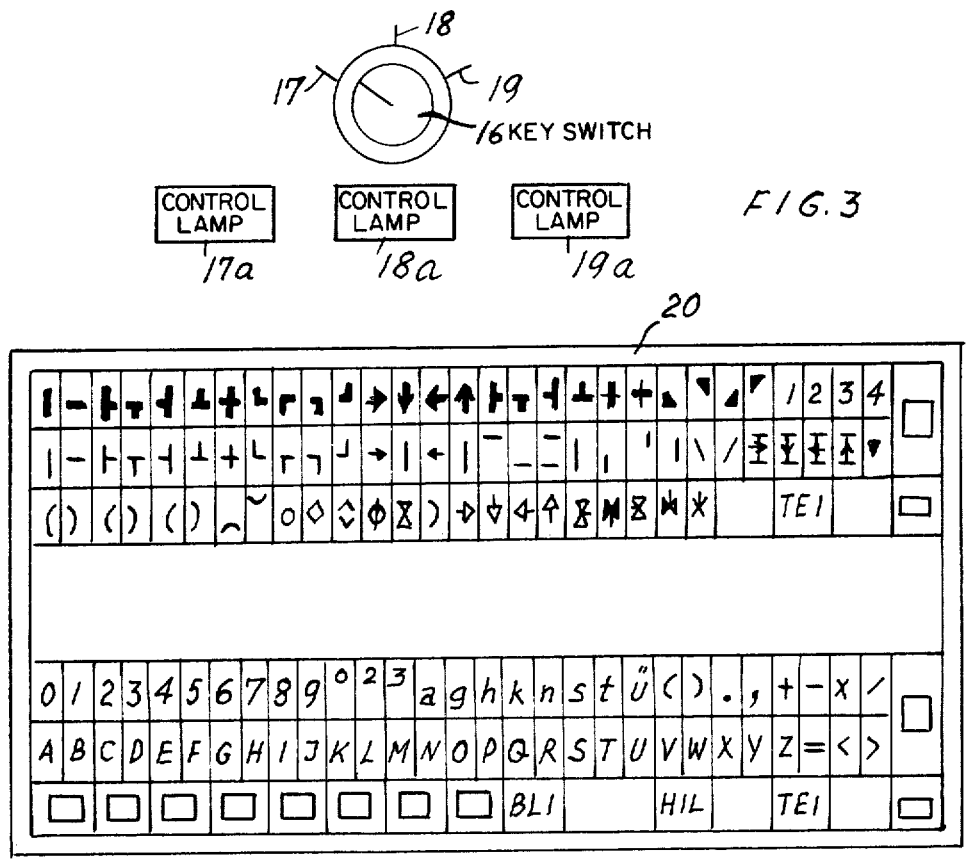
FIG. 3
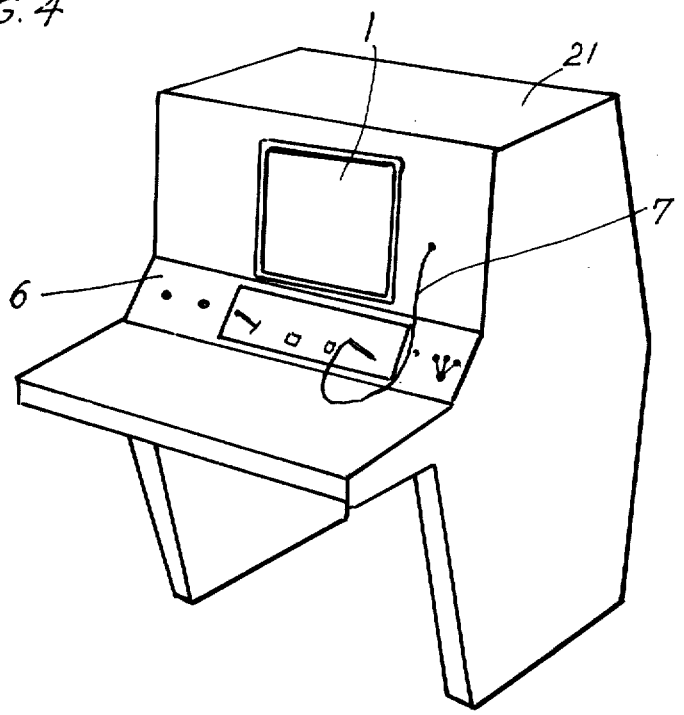
FIG. 4
FIG. 2

INPUT-OUTPUT-COLOR-SCREEN SYSTEM

BACKGROUND OF THE INVENTION

This invention relates to a system of man-machine intercommunication and its means, briefly a system, for use in control rooms. Elements or parts of technical processes as well as their states are to be displayed and the course of these processes to be controlled by the system. The means employed consist of a special combination of a color screen display instrument, a microcomputer, and a direct input device for screen coordinates (light pen). An input-output-color-screen system is provided having a color display screen device and a microcomputer having an associated working memory which is used as a screen refreshing memory, and a minidisc storage device for storing information signals. A virtual key board including symbols is provided on a section of the screen, and a light pen with associated control means is used to manually select desired symbols for display.

In discussing the background of the invention and in the detailed discussion thereof, reference will be made to the following articles.

1. Syrbe, M., Bacher, F.: The Role of the Human Operator in System Control. Real-time Control of Electric Power Systems. Elsevier Publishing Company, Amsterdam/New York, 1972, page 279–291.
2. Geiser, G., Syrbe, M.: Problems and Prospects in Large Control Rooms. Proceedings of the 13th International Automation and Instrumentation Conference "Human Engineering", Nov. 1974, Mailand, page b1 - b19.
3. Niedersteberg, W.: Informationdarstellung auf Datensichtstationen. Elektroanzeiger 28 (1975) Nr. 3, S. 37–39.
4. Offenlegungsschrift 2 152 594, Deutsche Kl.: 21c, 45/5, Verfahren und Anordnung zum Darstellen von Blindschaltbildern; Anmeldetag 22.10.1971.
5. Ameling, W. et. al.: Eingabe- und Bedienungselemente von Datensichtgeraten, NTZ-Report 15, VDE-Verlag, Berlin 1973, S. 42–46.
6. Grimm, R., Steusloff, H.: Verfahren zur Nachrichtenreduktion bei der Systemsicherung mit Prozebrechnern. Lecture Notes in Computer Science. 3. Jahrestagung Ges. fur Informatik. Springer Verlag, 1973.
7. Geiser, G., Schumacher, W.: Erleichterung der manuellen Mehrfachregelung durch integrierte Informationsdarstellung und kompatible Bedienung. Mitteilungen aus dem IITB, Karlsruhe, 1975, S. 53–56.

Background for the present invention is provided in the Proceedings of the International Symposium on Monitoring Behavior and Supervisory Control, Mar. 8-12, 1976; "Autonomous I/O-Colour-Screen-System for Process-Control with Virtual Keyboard Adapted of the Actual Task", pp. 328–339 by R. Grimm. This information was first published in Germany on Oct. 1, 1974 entitled "Unfrage zur Konzeption eines Ein-/Ausgabe-Farbbil dschirmysystems fur Proze Bwarten im Rahmen des von BMFT geforderten" at the Institut fur Informationsverarbeiting in Technik und Biologie, R. Grimm. a copy of which has been made of record.

Further information is also provided in an article entitled "Man and Computer in Process Control" by E. Edwards and F. P. Lees in the Institution of Chemical Engineers, England, 1972.

In control rooms it is necessary to display generally complex facts in a way best suited to man and task. This requires the use of every available form of coding for such displays, viz.:

o display of the process comprising
  number, name, symbol, color of the process element or part of plant;
  list, segmentation, schematic layout;
  general chart, more detailed partial charts, complete functional charts.
o display of states comprising
  single value display by positional and threshold information,
  display of analog value and development (curve plotting), digital display, display by symbols (e.g. bar for filling level in a container or arrow for change of direction);
  collective display by integrated or multidimensional displays as described above;
  supplementary code for changes of state, such as flashing, color change, auditory signals.

The flow of information at the man and machine interface during the operation of technical processes must be in accordance with man's capacity for processing information. Low rates of recognition of error should be the aim. This problem is discussed in the articles 1 and 2 listed above. Adaptation to actual tasks should not be realized by using specially manufactured equipment or arrangements but — as envisaged by the invention — by using standardized means which can be programmed with a light pen.

The following methods are known and generally used for the display of information in control rooms

| | |
|---|---|
| illuminated panels | which are all linked to |
| mosaic panels | relais or electronic |
| mini control panels | controls (discussed in the article 1 above) |

These techniques do not satisfy the requirements of a display of information that will give a true picture of a situation, nor do they comply with the need for rational production. In another technique the above types of panel combined in large displays are replaced by display screens (CRT displays) of which each is used for the display of one coding system, e.g. diagrams or graphs or alphanumerical lists. This technique is discussed in article No. 3 cited above. The input of commands is still performed by operating real switches and keyboards. Furthermore, it is known that the function of these switches and keyboards can be modified by using a joy stick which guides a cursor on the screen to the symbol of the required process element thus selecting this symbol for linkage with the real keyboard. Also, it has been proposed to replace the cursor by a light pen, or to divide the screen between a schematic layout and a list or a graph. Since the format of the screen does not suffice for the display of even only medium sized processes supplementary charts have to be selected which primarily guides the process must load the new chart into a screen refreshing memory before a different part of the process can be mapped. This process is discussed in article 4 cited herein above.

In commercial data processing keyboards are known that are to be simulated with the aid of a light pen. The keyboard is displayed on the screen (virtual keyboard) and one selects a symbol with the light pen. That symbol is then written into an input line of the same screen. This keyboard and operation is discussed in article 5 cited above. Besides, the light pen is also used to shift or erase text elements.

All these known methods do not provide solutions for the following problems:

the complete and autonomous performance of substantially all functions of control desks and monitoring centers including documentation;

a display change analogous to the instinctive head movement of the operator;

anthropotechnically optimized and hence situation-oriented process and state displays including the necessary operating instruments;

the same accommodation of the eye when observing information and when giving instructions;

an adaptation to the particular task, the particular process, by rationally producible standard instrumentation and standard data processing programs and light pen "display plotting; instead of by special instrumentation and wiring or special data processing programmes.

SUMMARY OF THE INVENTION

It is the object of the invention to solve these problems.

To attain this object the present invention provides an input-/output-color-screen-system which comprises a color display screen device; a microprocessor including a microcomputer associated with said device; a working memory in said microprocessor, said working memory being arranged simultaneously to serve as a screen refreshing memory; a mini disc storage device for temporarily storing process charts e.g. the flow diagram of the plant including displays and controls, that and all process data e.g. actual values and thresholds of analogous process elements, controls, process disturbance messages, etc., and a light pen with associated control means for selectively providing an independent input signal to the said screen system, whereby the system can perform its operatin, substantially independent of the computer, and input of commands without keyboards can be performed.

BRIEF DESCRIPTION OF THE DRAWINGS

An embodiment of the invention will now be described by way of example and with reference to the accompanying drawings, in which:

FIG. 2 is a perspective view of a model of an operating console;

FIG. 3 shows a key switch with control lamps;

FIG. 4 shows keyboards for chart generation;

DESCRIPTION OF THE PREFERRED EMBODIMENT

Figure 1:
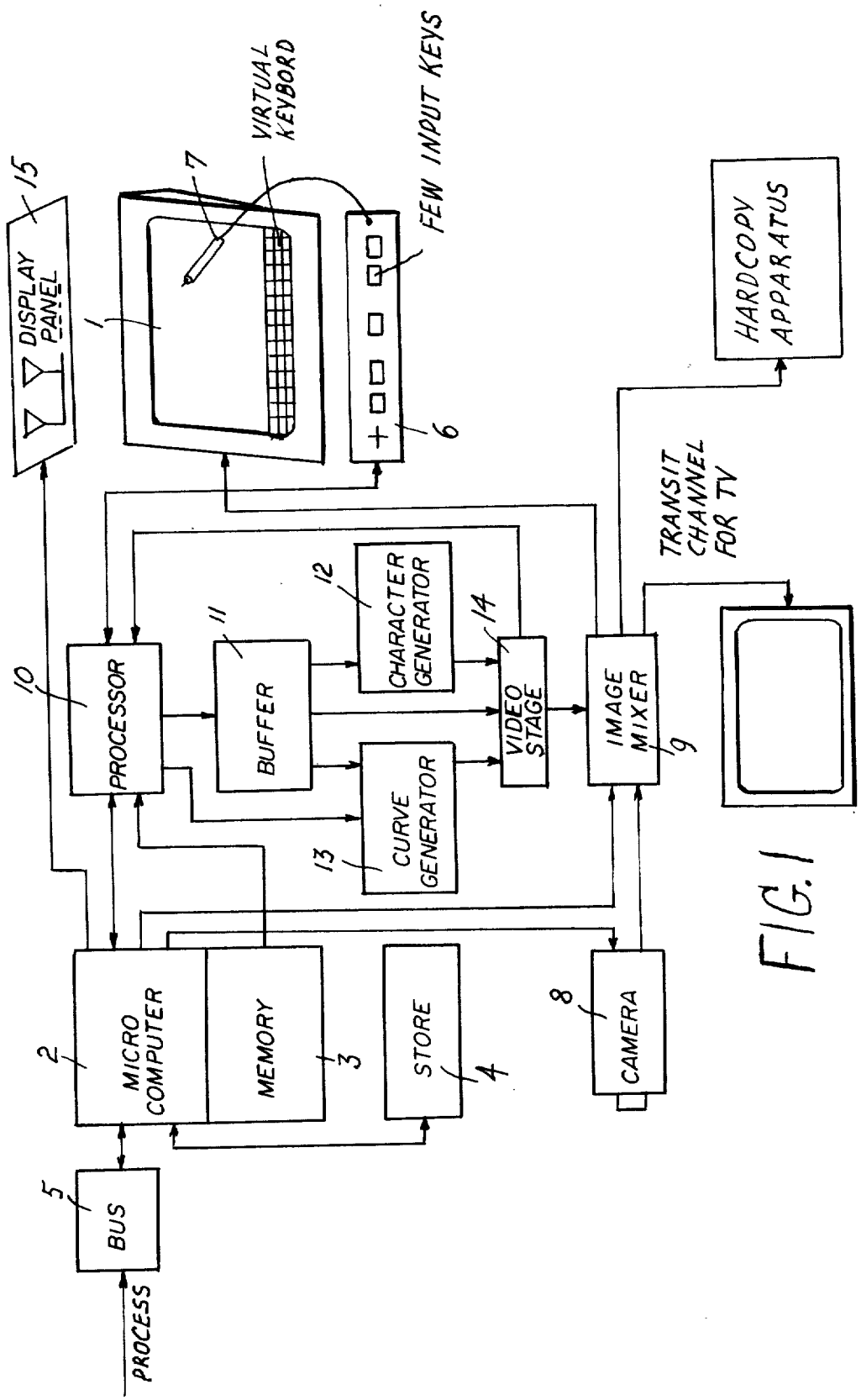
FIG. 1 is a block diagram of the input-/output-color-screen-system according to the invention.

With reference now to FIG. 1, the invention proposes to integrate a color display screen device 1 with a microcomputer 2 now obtainable at low cost, the working memory 3 of the computer being simultaneously used as a screen refreshing memory and enlarged by a miniature disc store 4 (e.g. a floppy disc) for storing momentarily unwanted process displays and process data as well as documentation. The process computer which is thus completely relieved of the process display function is connected by a bus and interface equipment 5. The data flow thus merely comprises data, reports and instructions (including reference values and thresholds).

The combination of the working memory and the screen refreshing memory in conjunction with a joy stick 6 permits a display of form instance nine times the size of the screen to be rolled to and fro "over" the screen by recomputation of addresses. The instinctive movement of the head is replaced by an instinctive movement of the hand.

By using virtual keys, e.g. keys that are on the screen of the display device, selectable by a light pen 7 these can be automatically adapted, with respect to size, image, place and shape, to the existing state of the process. The operator's eye remains accommodated to the display screen. Process states which are difficult to codify are superimposed on the graphic process display in the form of real scenes obtained by a T.V. camera 8 and an image mixer 9.

By the automatic compilation of a list during the plotting of the process image with the aid of the light pen, whereby symbol, relative place of symbol, name and data areas are coordinated, and by the simultaneous use of the name as a telegraphic address via the bus the use of standard instrumentation and standard programms is accomplished.

An output processor 10 controls the cyclic line-by-line transfer of the displays from the screen refreshing memory which is integrated with the working memory 3, to a line buffer 11, it performs the necessary recomputation of addresses (particularly for rolling), and from the light pen signal determines the screen coordinates as well as the address in the screen refreshing memory. The process information that is to be displayed and buffered in the very short line buffer 11 is prepared for color reproduction by a character and symbol generator 12, a curve generator 13 and by a video stage 14. The display screen device 1 is a color vision monitor because in the present state of the art an economical multi-color display cannot be otherwise obtained. The computer-controlled mixer 9 permits real scenes that are difficult to code as well as the process charts to be represented in common on the color display screen device 1.

The color display screen device 1, the joy stick 6 and the light pen 7 are mounted in a console (FIG. 2), the remainder of the hardware being in a cabinet which may be placed up to 35 yards away. The input-/output-color-screen-system (IOC) has three different modes:

chart generation 17 with control lamp 17a
process control 18 with control lamp 18a
maintenance 19 with control lamp 19a.

These modes can be selected by a key switch 16 (FIG. 3). A powder switch starts the IOC. The start includes boots-trap, loading of the programs and the symbol storage register, and chart output on the monitor.

At least two disc drives are provided:

Drive 1: system disc with programs and contents of charts

Drive 2: documentation disc for process data.

One further drive each for contents of charts and documentation may be provided.

Except for maintenance work only the documentation disc may be changed. The data generated during the change are buffered on the system disc.

MODE 'CHART GENERATION'

This program mode is started as described or when changing over from another mode by using the key switch (transition from on-line-to off-line-mode is organized autonomously by the system).

FIG. 4 shows by way of example a keyboard that can be used for the generation of the chart. The set of symbols 20 contains up to 256 alphanumerical characters and symbols which can be modified for each program. They are divided between different keyboards, e.g. symbol keyboards and an alphanumerical keyboard with color coding keys.

SELECTION OF THE FIRST KEYBOARD AND CHART GENERATION

Selection

When setting the key switch 16 to 'chart generation' 17 the first virtual keyboard and an empty image are displayed. With the aid of digits in the keyboard and the light pen a process chart can be selected. The format is determined as will be explained below. Either an auxiliary grid of a size corresponding to the size of the characters or the previously selected chart together with the grid will appear.

Choice of Chart Size

The maximum capacity of the screen refreshing memory determines how many times the size of the screen can be stored. The size of the virtual keyboards are added to the capacity of the screen refreshing memory. With the aid of a functional key and digits on the keyboard one of several different formats can be chosen for the graphics. The formats are multiples of the screen size.

on the system disc 48 screen sizes can be stored. Expansion to 110 screen sizes can be achieved by adding another disc drive. The IOC monitors the number of generated screen sizes and signals any screen size in excess of 48 screen sizes in the message line on the screen.

Once a process chart has been selected its left upper corner is displayed first. Rolling and splitting (see below) are allowed during the generation of the chart. The computation of adresses includes the complete image from the start.

Message Line

One line above the keyboard is left open for messages, e.g. to indicate faulty handling or to give cues to the next operating step. The execution of the program is blocked until the message has been acknowledged by the operator.

The message line is not affected by rolling or splitting.

Writing of Symbols

Symbols for the generation of the process chart (process graphics) are written by:

1. selection of the symbol by light pen 7 on the virtual keyboard,
2. selection of one or several positions where the symbol is to be written (thus permitting continuous plotting of e.g. horizontal or vertical lines).

If a position is selected previous to the symbol an error message will be displayed.

Thus a process chart is created but not yet a data list. The call number of the chart is set by the selection. In this phase the color of the chart is still black and white.

Integration of a Curve Representation

A curve can be inserted into the charts, which consists of a curve field and a labeling field.

Figure 5:
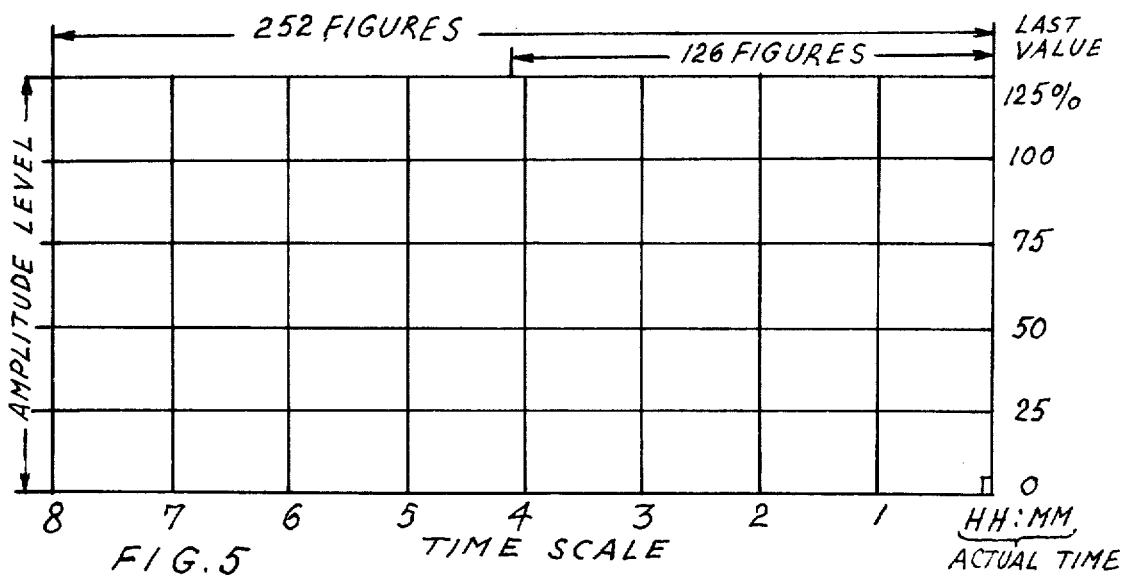
FIG. 5 represents a curve field.

The curve field has a resolution of 126 points in the $y$-direction and 126 or 252 points in the $x$-direction depending on the selected time scale. At the end of the time axis the time is represented by digits and characters where H stands for hours, M for minutes, and S for seconds, respectively. During the mode 'process control' a number below the origin indicates the actual time. The display can be set to hours/min. by selection of H and M, or to min./sec. by selection of S (FIG. 5).

Figure 6:
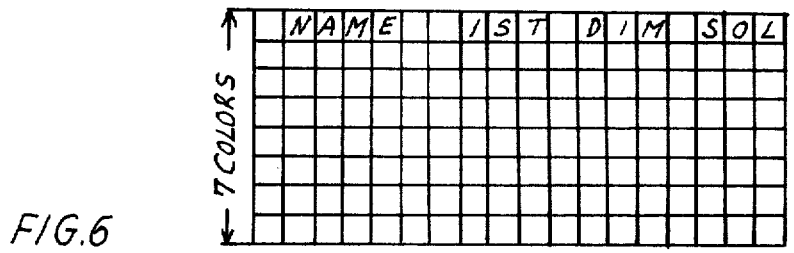
FIGS. 6, 7 and 8 show different labeling fields.
Figure 7:
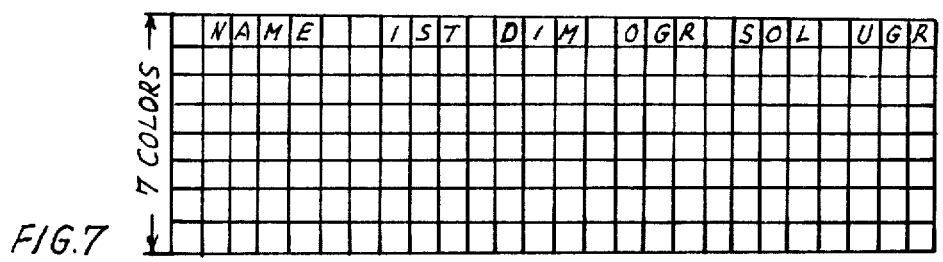
Figure 8:
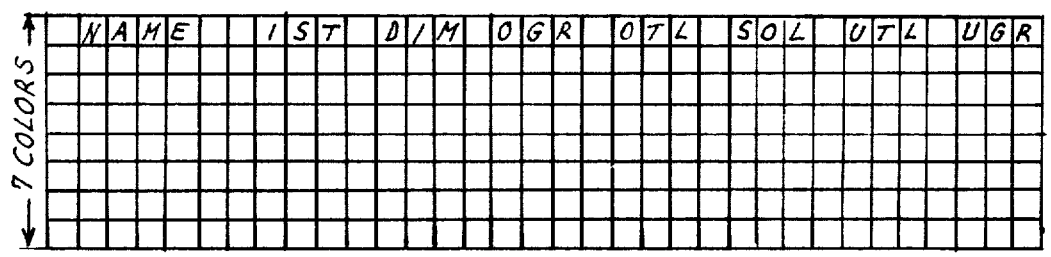

The labeling field has 8 symbol lines each for 18, 26 or 34 symbols depending on the number of thresholds that must be displayed for each measuring point (FIG. 6 through FIG. 8). The labeling field can be placed below or to the right of the curve field.

The selection of a symbol for the origin locates the complete curve field as if it were one symbol. The length of the curve field as well as position and length of the labeling field can be set with the aid of a 2-dim-code.

When symbol, number, position, and timescale have been selected, the curve field together with a coordinate grid, the identification line (time scale) and 7 initial color areas of the labeling field are inserted into the chart. The system checks that no other curve field can be found within an area of 32 symbol lines and 64 columns. (Also during 'rolling' more than one curve field can never be displayed; however, two labeling fields could be displayed).

Curve Representation in the Code 'X-Y-writer'

In order to trace the causes of disturbances in the process it is desirable to known the quickly changing variables and their time interrelationships. However, the data storage capacity must be limited. By reducing the redundancy of the data to be stored the memory can be used more efficiently. A discussion of such a reduction will be found in article 6 cited above. (Example: data collection for a paper-making machine: the working memory provided 10 registers for each measuring point. The time constants for the 24 measuring points ranged — according to the type —0 from 1 to 100 sec., the sampling interval from 1 to 60 sec. Given an average reduction rate of 5 the stored data extended 50 and 3000 sec. back into the past).

The values that are represented in the curve field are interpolated linearily from the stored and reduced values. Because of different sampling rates, different reduction ratios, and given constant storage length per signal, the curves date back differently. As long as the process continues, these values are supplemented by non-redundant actual values. After a break due to a fault a standing curve results.

Selection of the 2. Keyboard and Labeling Including Determination of the State Code By selecting the field 'TAST' and the digit '2' the symbol keyboard is replaced by the label keyboard and simultaneously the program 'Names and Lists' is activated. The previous state can be resumed by selecting 'TAST' and digit '1'. After selection of field 'NAME' on keyboard 2 the process chart can be labelled in a general form and connections between single process elements can be color coded:

Labeling
- o selection of a color key on the keyboard
- o selection of a position in the chart
- o selection of an alphanumerical string for labeling along a line up to the next selection of a color key Color coding
- o selection of a color key on the keyboard
- o selection of required symbols in the chart Labeling and color coding are each concluded by touching the key 'END'.

These activities merely entail entries in the process charts (in the screen refreshing memory) but the charts are not yet linked to the process. This is done in one block in the next stage:

Linkage Lists and Signal Types

Besides a process chart of limited size a data list exists in the working memory which contains all analogue and binary signals that appear in the process chart. The present invention provides for three different embodiments:

I. Analogue signals with thresholds and reference values which always occur simultaneously in a curve representation. In the system are stored the coordinates and contents of:

symbol
name of symbol (NAME)
measured value (IST)
dimension (DIM)
reference value (SOL)
thresholds (up to 4 values: upper (OGR) and lower (UGR) tolerance threshold (alert) and upper (OTL) and lower (UTL) emergency thresholds)
state code comprising
- o color symbol, name, actual value, and dimension in a unified way
- o color of curve and labeling line
- o emergency states
- o flicker state (of symbol); if there are two emergency stages one of them is displayed inverted.

II. Analog signals which do not appear in a curve representation.

In the system are stored the coordinates and contents of
symbol
name
measured value
dimension
state code.
The state code is an in I.

III. Binary signals
In the system are stored the coordinates and contents of
symbol
name
state code comprising
- o color
- o switch mode
- o emergency coding
  flickering
  inverted display
- o preparation for switching.

Binary signals can be provided externally by the process signals or they can be derived from threshold operations of analog signals.

WORKING STEPS

The described lists are written autonomously. After selection of the key 'LIST' in keyboard 2 these lists can be filed with information.

Signal I

Selection of a color key in the curve labeling field followed by an alphanumercial string on the keyboard (definition of the name)
entry of '0' for the measured value
entry of physical dimension which must be so chosen that the values for measured and reference values and thresholds are integers
entry of reference and threshold values.

Thus the curve labeling field is completed. The symbol that corresponds to the analog value is rolled into the center of the screen and in the stated order there is selected:

color code
selection of the symbol (thus one has autonomous color coding; if one symbol covers several grid areas the complete symbol is scanned; in this way macrosymbols can be defined)
entry of the name
selection of the position at any free place and then entry of the string for the name
value array
selection of 'IST' on the keyboard followed by definition of the array by selection of its position, key '0', and the dimensions. Note: After the definition of a measuring point rollback into the curve labeling field is therefore necessary.

Signal II color code
- o selection of a color key on the virtual keyboard
- o selection of the symbol (and hence autonomous color coding; of one symbol covers several grid areas the complete symbol is scanned, so that macrosymbols ca be defined)
entry of the name selection of the position at any free place and then entry of the string for the name
value array selection of 'IST' on the keyboard followed by definition of the array by selection of its position, of key '0', and of dimensions.

A vertical bar representation of analog values having the resolution of the TV grid spacing is feasible: the symbol 'B' is keyboard 1 is inserted into a character field and included as the final character of the sequence for an analog signal on keyboard 2, then the selection of the operating mode 'process control' will automatically cause a bar corresponding to the magnitude of the analog signal to appear in this place. By the superimposition of several 'B' symbols, the maximum height of a bar can be increased in stages of 9 TV lines at a time. If several 'B's are placed side by side these are similarly treated (e.g. liquid level indication). During labeling all those 'B's should be touched that are to be included in the procedure.

Signal III selection of the symbol; if one symbol covers several grid areas the complete symbol is scanned; macrosymbols can thus be defined
entry of the name selection of the position at any free place and then entry of the string for the name.

The actual state is collected through the interface with the process, transformed into the state code, and stored accordingly in the screen refreshing memory.

To every element that can be controlled from the console a special symbol (e.g. ◇) is attached which must be defined. Process elements having two states (e.g. switches) must be indicated during 'chart generation' in their expected normal position.

DATA PROCESSING

If redundancy of equipment for fault tolerance is required or if the IOC does not cooperate with a process control computer the system must be able to

| I   | { reduce redundancy<br>  linearize |
|-----|---|
| II  | { provide cyclic process signal input<br>  check data plausibility<br>  monitor thresholds |
| III | { compute measuring values |

Processing of group I is obligatory and implemented such that the tolerance range for the redundancy reduction is adapted to the signal. If it should be necessary to smooth measured signals the user should do this with special hardware at the interface to the IOC.

Processing of group II can be performed for a plurality of measuring points depending - among other parameters — upon the sampling frequency.

Processing of group III should be capable of being programmed on the screen. For this task a separate image is subdivided into N fields. The head of each field contains the algorithm of the module that must be executed, e.g. in a PEARL-notation with constants as simple characters. This notation cannot be overwritten because the modules are fixed and cannot be changed with the light pen. The characters can be associated M times with signal means and, in the case of constants, with numerical values. The permissible frequency M of utilization of a module is determined individually for each module. It depends upon the available computing time.

A special module permits the reference value of a quantity to be defined as an indirectly measured actual value and hence to be inserted into the curve and bar displays.

ROLLING AND SPLITTING, SELECTION OF CHARTS

Rolling

Rolling is possible in any mode at any time and is done simply by moving the joy stick without any special preselection in vertical, horizontal or diagonal direction. The joy stick always returns to neutral.

Increased pressure in the vertical or horizontal permits neighboring charts to be called up. This is intended to assist the operator by facilitating transfer to the IOC in control rooms where the process mappings are very large, without requiring the working store to be overloaded with screen refreshing data. Besides this method of operation direct call-up of charts by means of the light pen is always possible.

Splitting

Splitting can be performed only in the mode 'chart generation' with keyboard 1. This function operates as follows:

selection of key 'SPL' setting of a directional arrow setting of up to three digits giving a sum indicating width or height of the split area. The selection is made easy by the superimposition on the screen of the grid indication of the coordinates of the split.

This results in a split across the entire image field (including elements which are not displayed). If large elements are cut the user must complete them himself.

Selection of charts, General View of Process

A collective message is associated with each chart used for process mapping, viz:

out of action normal operation danger situation.

These messages are displayed through the process output if a mosaic panel 15 is present (FIG. 1). The arrangement of the mosaic panel ought to facilitate convenient association with chart selecting numbers.

If a mosaic panel cannot be provided the first chart should serve as a substitute and called prior to the selection. In this case the chart can also display the components of the IOC and their states.

After the selection of a new chart the upper left corner of the chart is displayed in the mode 'chart generation'. During 'process control' the center of the chart appears in the middle of the screen.

MODE 'PROCESS CONTROL'

This mode is activated as follows:

by switching the key switch if the process is already in operation by the bootstrap if the process is about to be started. The functions rolling chart selection are the same as in the mode 'CHART GENERATION', all other functions remaining inoperative.

GENERAL VIEW

The general mosaic view — or optionally the first chart — contains information as described above and forms the basis for chart selection. For each process chart (each mosaic symbol)

| no singal    | means | out of action |
|--------------|-------|---------------|
| green signal | means | system go |
| red signal   |       | danger, more particularly<br>o steady red alert<br>o flickering red emergency. |

KEYBOARD FOR PROCESS CONTROL

The keyboard for process control has one line and may have the following form:

| 0 | 1 | 2 | 3 | 4 | 5 | 6 | 7 | 8 | 9 | COR | OFF | ON | CLO | OPN | SPREAD | CHART |

The message line is above the keyboard. During 'process control' every entry in the message line is accompanied by an auditory signal which ceases on acknowledgement of the message.

ARRIVAL OF MEASURED ANALOG VALUES

If the IOC is used in a process control system, the process control computer provides the IOC continuously with telegrams which transmit analog values together with the name of the signal. The signals are in a redundancy reduced form.

During stand-alone operation a program for data transmission control or input is started together with the bootstrap. This program calls up the measured values in a cyclic order. The sampling sequence(s) is (are) built into the program. These programs can be synchronized externally or cycle control is also possible (e.g. return to zero at the end of a cycle).

Each analog value is processed as described in the section 'Data Processing'.

All signals I are redundancy reduced in their buffer in the working memory and they are there stored on the documentation disc. Furthermore, signals that belong to the process chart which is in the screen refreshing memory at this particular moment are updated in the working memory.

Signals II are not updated on the disc nor are they documented.

Input of 'Analog Values' for Process Control

During 'process control' reference values and thresholds can be altered. Each of these values is contained in the labeling field of a curve field. In order to change a value the corresponding chart is selected and rolled on the screen. By touching the key 'COR' and the first digit in the labeling field (position) with the aid of the light pen the new entry is prepared. The new string is entered, the state of that entry being set to 'flicker'.

The correction is implemented by touching the key 'ENTER'. If this is not done within 10 seconds the system resumes its previous state. If more than one value is keyed prior to 'ENTER' a reject message appears. Reference values and thresholds that belong to symbols in the process chart can be changed by adding a second digit array (the first array contains the measured value). For this operation the keyboard contains keys that preselect the type of value (reference or threshold), one of which must be chosen. This second array is activated by selection of the process symbol, the key 'COR', and the key for the type of the value. This procedure can be performed for signals I and II.

Arrival of Binary Signals

Binary signals are divided into two dimensions:
generation via:
o process input
o programmed threshold checks
type:
o normal procedural events
o alert
o emergency.

After arrival of any of these signals the chart in the screen refreshing memory as well as the linkage lists on the system disc (state code) must be updated.

Before the signals are stored the system checks the alarm state of the process element and then transforms the signal into the corresponding state code. This operation is performed for both externally and internally generated signals.

When disturbance messages arrive symbols in the general view (mosaic or first chart) representing the disturbed part in the process are marked red and flicker at a given frequency. If the symbol of the disturbed part is contained in several collective symbols — which correspond to process detail charts — all these collective symbols are similarly marked. The first message is displayed in the message line together with an auditory warning. If more messages arrive before the first is acknowledged the later messages are stored.

If another chart is selected at the same time as a disturbance message arrives, then this chart remains until the message is acknowledged. After acknowledgment the general view is displayed automatically.

The chart of this process part is selected by setting the light pen to the relative collective symbol in the general view. The symbol of the faulty device (if there are several, the symbol of the first) is automatically displayed in the center of the screen.

If a more detailed functional chart of the relevant process detail exists it can be selected by using the light pen. The number of each functional chart must be stated during 'CHART GENERATION'. The same must be done in the general view with respect to the numbers of the process detail charts.

If several disturbance messages arrive before the first message is acknowledged the next message will be displayed after acknowledgment of the preceding message.

Input of Control Signals

Process elements having two states (such as switches) can be operated during 'process control'.

The corresponding chart is selected and the required symbol rolled onto the screen. By touching the key 'COR', selecting the switching symbol next to the element, and the command, the display of that element is changed to its new state and flickers.

Touching of the (physically real) key 'ENTER' gives effect to the correction and a corresponding command is transmitted via the process output. Waiting for information feedback may be allowed for before flickering ends. If the correction is not effected within 10 seconds by 'ENTER' the system automatically resumes the previous state of display. If more than one signal is keyed in prior to 'ENTER' a reject message appears.

Input of continuous control signals is provided for by a "procedure for the parallel, integrated display of control errors and a serial, compatible mode of control" in the IOC. This procedure is discussed in article 7 cited hereinabove.

Time Spread

The key 'SPREAD' updates all values represented in a curve field on the screen at the highest sampling rate. The labeling of the time scale is altered accordingly.

Free Combination of Curves During Operation

A separate image contains optionally a fixed curve field embracing 126 × 252 points in which 7 curves can be reselected even during 'process control'. The only condition is that no process chart must be in the image.

The above-described solution of the contemplated problem and the illustrative description of an embodiment of the method are supplemented by steps for raising the operating reliability of the system:

| IOC-System | Process control system |
|---|---|
| Two Floppy-disc-drives are provided (allowing for one to fail) | An emergency-break-switch is provided for the process. |

-continued

| Further steps are: | Further steps are: |
|---|---|
| second light pen as above and second light pen control as above and second monitor duplicated IOC-system ○ normally performing 2 different operational tasks ○ in case of failure: all operating tasks performed by the undisturbed system. | transition to decentralized manual control parallel central manual control of a few important control elements (binary and analog). |

The invention may be embodied in other specific forms without departing from the spirit or essential characteristics thereof. The embodiments are therefore to be considered in all respects as illustrative and not restrictive.

What is claimed is:

1. An input-output color screeen system comprising
   a. a color display screen device (1);
   b. a microcomputer (2) connected so as to provide to said color display device data and control signals;
   c. working memory means (3) in said microcomputer for providing screen refreshing signals for said color display screen device;
   d. mini disc storage means (4) connectd to said microcomputer for storing data signals, said data being supplied to said display screen through said microcomputer;
   e. output processor means (10) coupled between said microcomputer and said display screen;
   f. manual control means (6) connected to said output processor means for selectively controlling said screen refreshing and said information signal outputs from said output processor means to said display screen;
   g. a virtual keyboard including symbols (20) displayed on a portion of said screen; and
   h. light pen means (7) connected to said manual control means for selecting a symbol to be displayed on the remaining portion of said screen.

2. The system of claim 1 further comprising
   a display panel (15) adjacent said color display screen connected to the output of said microcomputer for providing a supplemental display of all signals provided by said microcomputer.

3. The system of claim 1 further comprising
   curve generator means (13) coupled between said output processor means and said display screen for displaying a preselected curve on said screen.

* * * * *